United States Patent
Kim (10) Patent No.: US 12,221,004 B2
(45) Date of Patent: Feb. 11, 2025

(54) SYSTEM AND METHOD FOR CHARGING ELECTRIC MOTOR VEHICLE

(71) Applicants: Hyundai Motor Company, Seoul (KR); Kia Corporation, Seoul (KR)

(72) Inventor: Hyeon Uk Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 502 days.

(21) Appl. No.: 17/584,626

(22) Filed: Jan. 26, 2022

(65) Prior Publication Data

US 2023/0039202 A1   Feb. 9, 2023

(30) Foreign Application Priority Data

Aug. 6, 2021   (KR) .................. 10-2021-0104014

(51) Int. Cl.
  *B60L 53/63*   (2019.01)
  *B60L 53/62*   (2019.01)
  *B60L 53/66*   (2019.01)
  *H02J 7/00*   (2006.01)

(52) U.S. Cl.
  CPC .............. *B60L 53/63* (2019.02); *B60L 53/62* (2019.02); *B60L 53/66* (2019.02); *H02J 7/0024* (2013.01)

(58) Field of Classification Search
  CPC .......... B60L 53/63; B60L 53/62; B60L 53/66; B60L 53/305; B60L 53/68; B60L 53/67; B60L 53/16; B60L 58/12; H02J 7/0024; Y02T 10/70; Y02T 10/7072; Y02T 90/12; Y02T 90/14; B60Y 2200/91
  USPC ............................................ 320/109
  See application file for complete search history.

(56) References Cited

U.S. PATENT DOCUMENTS

2014/0347017 A1\* 11/2014 Sugano .................. B60L 53/122
                                                      320/137

\* cited by examiner

*Primary Examiner* — Paul Dinh
(74) *Attorney, Agent, or Firm* — Slater Matsil, LLP (57) ABSTRACT

An embodiment system for charging an electric motor vehicle includes a first switching circuit configured to select one of at least two chargers, a second switching circuit configured to select a charging station connector to be connected to the charger selected by the first switching circuit, and a controller configured to control the first switching circuit and the second switching circuit based on a predetermined charging order to allow charging of a battery of a vehicle that is connected to the charging station connector to be performed, sense connection of a charging connector of the vehicle to the charging station connector, receive a required charging amount and an available waiting time of the vehicle, and determine the charging order based on the required charging amount and the available waiting time.

20 Claims, 7 Drawing Sheets

SYSTEM AND METHOD FOR CHARGING ELECTRIC MOTOR VEHICLE

CROSS-REFERENCE TO RELATED APPLICATIONS

This application claims the benefit of Korean Patent Application No. 10-2021-0104014, filed on Aug. 6, 2021, which application is hereby incorporated herein by reference.

TECHNICAL FIELD

The present disclosure relates to a system and a method for charging an electric motor vehicle.

BACKGROUND

As a demand for electric motor vehicles, such as electric vehicles, increases rapidly as environmental problems arise around the world, supply of charging facilities (infrastructures) is expanding. The charging facilities provide charging services on a first-in, first-out (FIFO) basis. Such operation scheme has a problem of waiting for charging.

SUMMARY

Embodiments of the present disclosure can solve problems occurring in the prior art while advantages achieved by the prior art are maintained intact.

Embodiments of the present disclosure provide a system and a method for charging an electric motor vehicle that determine a charging order in consideration of a required charging amount and an available waiting time and perform vehicle charging based on the determined charging order.

The technical problems to be solved by embodiments of the present disclosure are not limited to the aforementioned problems, and any other technical problems not mentioned herein will be clearly understood from the following description by those skilled in the art to which the present disclosure pertains.

According to an embodiment of the present disclosure, a system for charging an electric motor vehicle includes a first switching circuit for selecting one of at least two chargers, a second switching circuit for selecting a charging station connector to be connected to the charger selected by the first switching circuit, and a controller that controls the first switching circuit and the second switching circuit based on a predetermined charging order to allow charging of a battery of a vehicle that has requested the charging connected to the charging station connector to be performed, and the controller senses connection of a charging connector of the vehicle that has requested the charging to the charging station connector, receives a required charging amount and an available waiting time of the vehicle that has requested the charging, and determines the charging order based on the required charging amount and the available waiting time.

In one implementation, the available waiting time may be a time from a charging request time point to a desired charging completion time point.

In one implementation, the controller may consider whether a waiting delay is allowed of the vehicle that has requested the charging when determining the charging order.

In one implementation, the controller may pay compensation points to a vehicle whose charging order is changed to a lower priority.

In one implementation, the controller may deduct predetermined points from a vehicle whose charging order is changed to a higher priority.

In one implementation, the controller may determine an expected charging start time, an expected charging completion time, and a power distribution location based on a charger distribution status.

In one implementation, the controller may control the first switching circuit and the second switching circuit based on the power distribution location to form a charging power supply path.

In one implementation, the controller may flexibly adjust the charging order of the vehicle that has requested the charging within the available waiting time.

According to another embodiment of the present disclosure, a method for charging an electric motor vehicle using an electric motor vehicle charging system including a first switching circuit for selecting one of at least two chargers, a second switching circuit for selecting a charging station connector to be connected to the charger selected by the first switching circuit, and a controller configured to control the first switching circuit and the second switching circuit includes sensing connection of a charging connector of a vehicle that has requested charging to the charging station connector, receiving a required charging amount and an available waiting time of the vehicle that has requested the charging, determining a charging order of the vehicle that has requested the charging based on the required charging amount and the available waiting time, and controlling the first switching circuit and the second switching circuit based on the charging order to perform charging of a battery of the vehicle that has requested the charging.

In one implementation, the available waiting time may be a time from a charging request time point to a desired charging completion time point.

In one implementation, the determining of the charging order of the vehicle that has requested the charging may include determining the charging by considering whether waiting delay is allowed of the vehicle that has requested the charging.

In one implementation, the determining of the charging order of the vehicle that has requested the charging may further include paying compensation points to a vehicle whose charging order is changed to a lower priority.

In one implementation, the determining of the charging order of the vehicle that has requested the charging may further include deducting predetermined points from a vehicle whose charging order is changed to a higher priority.

In one implementation, the determining of the charging order of the vehicle that has requested the charging may further include determining an expected charging start time, an expected charging completion time, and a power distribution location based on a charger distribution status.

In one implementation, the performing of the charging of the battery of the vehicle that has requested the charging may include controlling the first switching circuit and the second switching circuit based on the power distribution location to form a charging power supply path.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Hereinafter, some embodiments of the present disclosure will be described in detail with reference to the exemplary drawings. In adding the reference numerals to the components of each drawing, it should be noted that the identical or equivalent component is designated by the identical numeral even when it is displayed on other drawings. Further, in describing the embodiments of the present disclosure, a detailed description of the related known configuration or function will be omitted when it is determined that it interferes with the understanding of the embodiments of the present disclosure.

In describing the components of the embodiments according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
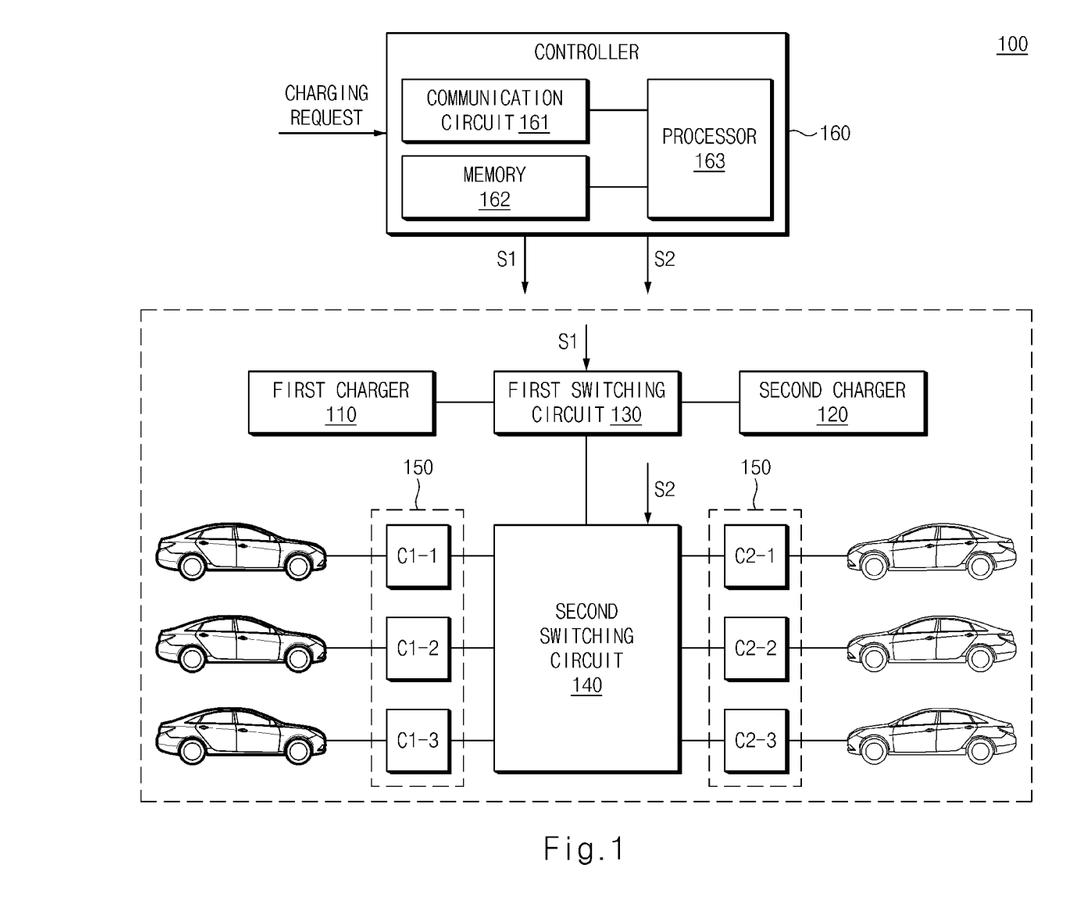
FIG. 1 is a block diagram showing an electric motor vehicle charging system according to embodiments of the present disclosure.

FIG. 1 is a block diagram showing an electric motor vehicle charging system according to embodiments of the present disclosure.

Referring to FIG. 1, an electric motor vehicle charging system 100 may include a first charger 110, a second charger 120, a first switching circuit 130, a second switching circuit 140, a plurality of charging station connectors 150, and a controller 160.

The first charger 110 and the second charger 120 may supply charging power for charging a battery of an electric motor vehicle (hereinafter, a vehicle). The first charger 110 and the second charger 120 may receive external power (e.g., commercial power), change the external power to charging power (a voltage or a current) of a predetermined level, and output the charging power of the predetermined level. In this connection, the predetermined level may be a rated voltage and/or a rated current for charging the battery of the vehicle. Each of the first charger 110 and the second charger 120 may include a converter and/or an inverter for converting a voltage and/or a current of the external power into the rated voltage and/or the rated current. In the present embodiment, two chargers are disposed as an example, but the present embodiment is not limited thereto, and three or more chargers are able to be disposed.

The first switching circuit 130 and the second switching circuit 140 may determine a charging power supply path (a power supply path) to supply the charging power in response to switching commands S1 and S2 of the controller 160. The first switching circuit 130 may be disposed at output terminals of the first charger 110 and the second charger 120 to select a charger to perform the supply of the charging power. The first switching circuit 130 may include a plurality of switches (not shown). The second switching circuit 140 may select the charging station connector 150 to be connected to the charger selected by the first switching circuit 130. The second switching circuit 140 may include a plurality of switches respectively corresponding to the charging station connectors. Each switch may electrically connect or disconnect the charger selected by the first switching circuit 130 to or from each charging station connector.

As an example, when the first switching circuit 130 selects the first charger 110, and the second switching circuit 140 selects a charging station connector C1-3, a vehicle connected to the charging station connector C1-3 may charge a battery thereof with charging power supplied from the first charger 110.

As another example, the first switching circuit 130 and the second switching circuit 140 may electrically connect the first charger 110 to a charging station connector C1-1, and electrically connect the second charger 120 to a charging station connector C2-2 in response to an instruction (a control command) of the controller 160. In this case, a vehicle connected to the charging station connector C1-1 may receive the charging power from the first charger 110 and perform the battery charging, and a vehicle connected to the charging station connector C2-2 may receive charging power from the second charger 120 and perform the battery charging.

The plurality of charging station connectors 150, which are connection mechanisms for connecting to a charging connector (not shown) of the vehicle, may support a fast charging scheme such as DC combo, CHAdeMO™, and/or three-phase AC. The plurality of charging station connectors 150 may also support a wireless charging scheme. The plurality of charging station connectors 150 may supply the charging power supplied from the first charger 110 or the second charger 120 to the vehicle based on the power supply path generated by the first switching circuit 130 and the second switching circuit 140. For example, C1-1, C1-2, and C1-3 of the plurality of charging station connectors 150 may supply the charging power provided from the first charger 110 to the vehicle, and C2-1, C2-2, and C2-3 may be electrically connected to the second charger 120 to supply the charging power output from the second charger 120 to the vehicle. The plurality of charging station connectors 150 may support data communication between the controller 160 and the vehicle.

The controller 160 may control overall operations of the electric motor vehicle charging system 100. The controller 160 may include a communication circuit 161, a memory 162, and a processor 163.

The communication circuit 161 may support the controller 160 to perform wireless communication or wired communication with an external device such as the vehicle (or a vehicle terminal), a user terminal, or the like. The communication circuit 161 may include a wireless communication circuit (e.g., a mobile communication circuit, a short-range wireless communication circuit, a global navigation satellite system (GNSS) communication circuit, or the like) and/or a wired communication circuit (e.g., a local area network (LAN) communication circuit, an Ethernet communication circuit, a power line communication circuit, or the like). The communication circuit 161 may receive a charging request transmitted from the vehicle using the wireless communication circuit or the wired communication circuit. The charging request may include at least one of information such as a required charging amount, an available waiting time, whether waiting delay is allowed (ON/Off of a waiting delay function), user identification information, and/or vehicle identification information. The required charging amount may be a target state of charge (SOC) or a difference value obtained by subtracting a remaining battery (SOC) from the target state of charge. The available waiting time may be defined as a time from a charging request time point (that is, a current time) to a desired charging completion time point (that is, a vehicle exit desired time).

The memory 162 may store a charging order determination algorithm or the like, and may also store information such as a predetermined compensation rule or the like. The memory 162 may be a non-transitory storage medium that stores instructions executed by the processor 163. The memory 162 may include at least one of storage media such as a flash memory, a hard disk, a solid state disk (SSD), a secure digital card (SD card), a random access memory (RAM), a static random access memory (SRAM), a read only memory (ROM), a programmable read only memory (PROM), an electrically erasable and programmable ROM (EEPROM), an erasable and programmable ROM (EPROM), an embedded multimedia card (eMMC), and/or a universal flash storage (UFS).

The processor 163 may control overall operations of the controller 160. The processor 163 may include at least one of processing devices such as an application specific integrated circuit (ASIC), a digital signal processor (DSP), a programmable logic device (PLD), a field programmable gate array (FPGA), a central processing unit (CPU), a microcontroller, and/or a microprocessor.

When the charging connector of the vehicle is connected to at least one of the plurality of charging station connectors 150, the processor 163 may sense the same. When the charging connector of the vehicle (a vehicle connector) is connected to each of the plurality of charging station connectors 150, each of the plurality of charging station connectors 150 may transmit a signal informing the connection of the vehicle connector to the processor 163. When the vehicle connector is connected to the charging station connector, the processor 163 may receive the current remaining battery from the corresponding vehicle.

The processor 163 may receive the charging request for the vehicle connected to the charging station connector. The processor 163 may receive the charging request from a user interface (e.g., a touch screen) equipped around the charging station connector or the vehicle.

As an example, when a user inputs the target state of charge and the available waiting time using the user interface equipped at a charging station, the user interface may calculate the required charging amount based on the target state of charge and the remaining battery of the vehicle, and generate and transmit a charging request message including the calculated required charging amount and the available waiting time.

As another example, the vehicle connected to the charging station connector may calculate the required charging amount based on the remaining battery and a desired state of charge of the user (the target state of charge). In addition, the vehicle connected to the charging station connector may receive the available waiting time from the user through a user interface equipped inside the vehicle. The vehicle connected to the charging station connector may generate the charging request message using the calculated required charging amount and the received available waiting time and transmit the charging request message.

The processor 163 may determine a charging order of a vehicle that has requested the charging based on the received required charging amount and available waiting time. When there is at least one vehicle that has requested the charging, which is connected in advance to the charging station connector 150, the processor 163 may determine the charging order based on a required charging amount and an available waiting time of each vehicle.

In addition, the processor 163 may determine an expected time and a power distribution location based on a charger distribution status. The expected time may include a charging start time and/or a charging completion time of each vehicle that has requested the charging. The charger distribution status may include a charging schedule (an operating schedule) of each charger.

The processor 163 may control the first charger 110 and/or the second charger 120 to supply the charging power to the vehicle based on the determined charging order. The processor 163 may generate the power supply path by controlling the first switching circuit 130 and the second switching circuit 140 based on the determined power distribution location. A charging-target-vehicle based on the charging order may charge the battery (a high voltage battery) using the charging power supplied along the generated power supply path.

In addition, the processor 163 may flexibly adjust the charging order of the vehicles that have requested the charging within the available waiting time. In this connection, the processor 163 may adjust the charging order by further considering whether the waiting delay is allowed of the vehicles that have requested the charging. For example, when adjusting the charging order, the processor 163 may change a charging order of a waiting delay-allowing-vehicle to a lower priority, and may maintain a charging order of a waiting delay-not allowing-vehicle or change the charging order of the waiting delay-not allowing-vehicle to a higher priority.

When the charging order is changed, the processor 163 may deduct points from the vehicle whose charging order is changed to a higher priority based on the predetermined compensation rule, and pay the deducted points to the vehicle whose charging order is changed to a lower priority as compensation points. The processor 163 may determine the points to be deducted based on a waiting reduction time. In addition, the processor 163 may determine the compensation points to be paid based on a waiting delay time.

When there is a waiting time reduction request from a vehicle in waiting, the processor 163 may deduct predetermined points from accumulated points of the corresponding vehicle and may change a charging order of the corresponding vehicle to a higher priority. The processor 163 may pay the points deducted from the vehicle whose charging order is changed to the higher priority to a vehicle whose charging order is changed to a lower priority because the charging order of the vehicle in waiting is changed to the higher priority as the compensation points.

Figure 2:
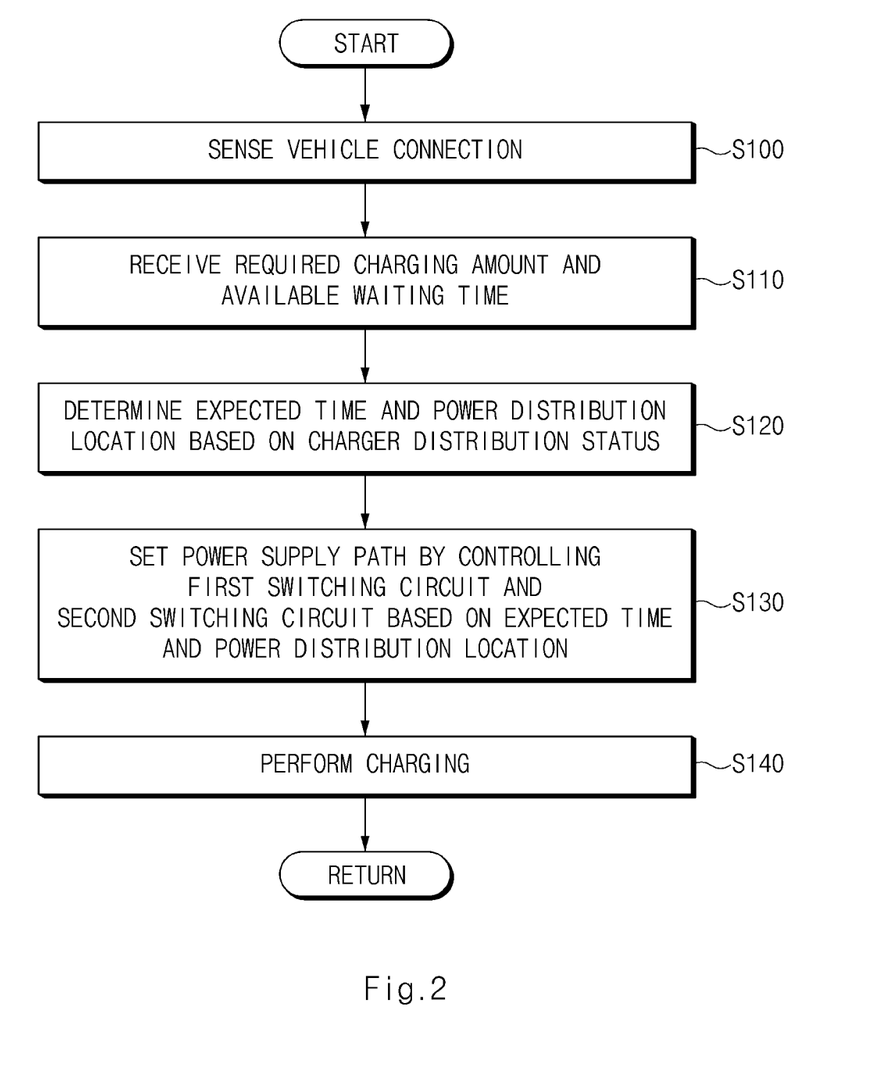
FIG. 2 is a flowchart showing an electric motor vehicle charging method according to embodiments of the present disclosure.

FIG. 2 is a flowchart showing an electric motor vehicle charging method according to embodiments of the present disclosure.

The controller 160 may sense the vehicle connection (S100). When the charging connector of the vehicle is connected to the charging station connector 150, the processor 163 of the controller 160 may sense the same. When the charging connector is connected thereto, the charging station connector 150 may transmit the signal informing the connection of the charging connector to the controller 160.

The controller 160 may receive the required charging amount and the available waiting time (S110). The controller 160 may receive the charging request including the required charging amount and the available waiting time. In this connection, the controller 160 may receive the charging request from the vehicle or receive the charging request from the user interface equipped in the charging station.

The controller 160 may determine the expected time and the power distribution location based on the charger distribution status (S120). The controller 160 may determine the expected time including the charging start time and the charging completion time of the vehicle that has requested the charging in consideration of a charging waiting status (or a charging power supply schedule) of each charger. In other words, the controller 160 may determine the charging order of the vehicle that has requested the charging based on the required charging amount, the available waiting time, and the charger distribution status. In addition, the controller 160 may determine the power distribution location, that is, a switch state in the first switching circuit 130 and the second switching circuit 140 based on the required charging amount, the available waiting time, and the charger distribution status.

The controller 160 may set the power supply path by controlling the first switching circuit 130 and the second switching circuit 140 based on the expected time and the power distribution location (S130). When the expected time is reached, the controller 160 may identify completion of charging of a vehicle that has been charging, and then control the switch state in the first switching circuit 130 and the second switching circuit 140 based on the power distribution location.

The controller 160 may perform the charging of the battery of the vehicle using the charging power supplied along the power supply path (S140). The controller 160 may supply the charging power output from the first charger 110 and/or the second charger 120 to the vehicle using the power supply path formed by the control of the first switching circuit 130 and the second switching circuit 140.

Thereafter, when a new charging desired vehicle is sensed by the charging station connector 150, the controller 160 may return to S110 and perform the subsequent operations again.

Figure 3:
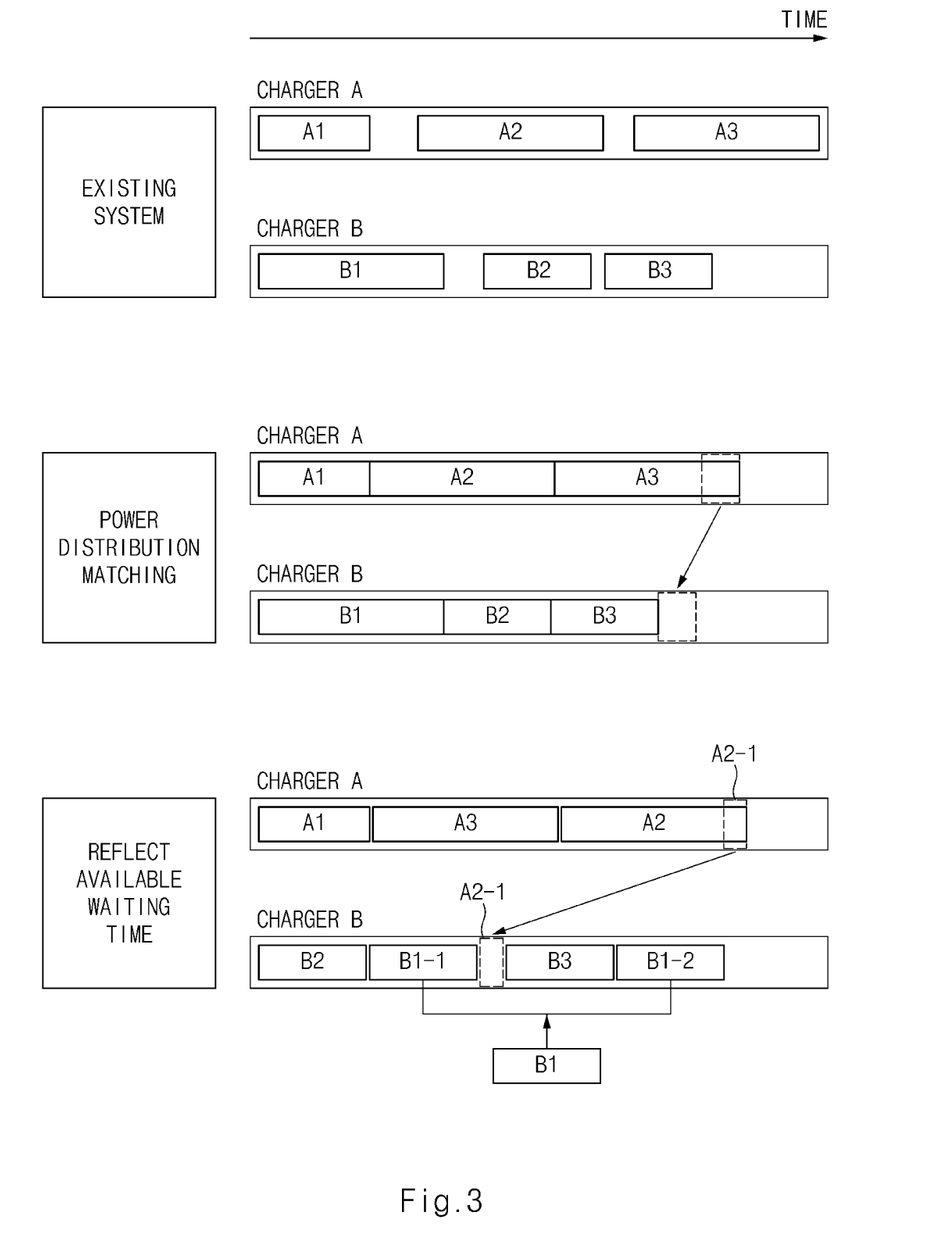
FIG. 3 is a view for illustrating a charging waiting time reduction effect according to embodiments of the present disclosure.

FIG. 3 is a view for illustrating a charging waiting time reduction effect according to embodiments of the present disclosure.

In an existing system, a vehicle A1 of a user who made a charging request to a charger A first and a vehicle B1 of a user who made a charging request to a charger B first may perform charging first. Vehicles A2, A3, B2, and B3 that requested charging later than the vehicle A1 and the vehicle B1 must wait until the vehicle A1 or the vehicle B1 completes the charging, and must wait as much as a delay time that occurs when changing a vehicle to be charged.

In the electric motor vehicle charging system 100, charging waiting vehicles may be evenly assigned to the charger A and the charger B with reference to a power distribution status of the charger A and the charger B such that the charging waiting vehicles do not rush to one of the charger A and the charger B. The electric motor vehicle charging system 100 may reduce the delay time that occurs when the vehicle to be charged is changed through power distribution matching. Therefore, vehicles A3 and B3 may complete the charging faster than in the existing system.

In addition, the electric motor vehicle charging system 100 may change the charging order of the vehicle in consideration of the available waiting time. As an example, when a vehicle A3 has a similar required charging amount, but has a shorter available waiting time compared to a vehicle A2, the electric motor vehicle charging system 100 may change (adjust) a charging order of the vehicle A3 to a higher priority than the vehicle A2.

As another example, the electric motor vehicle charging system 100 may allow a partial amount of charging A2-1 of the vehicle A2, which is waiting for the charging by the charger A, to be charged using the charger B. The electric motor vehicle charging system 100 may identify a work schedule (a charging schedule) of the charger B, and allow a battery of the vehicle A2 to be charged during an idle time that occurs between vehicles in waiting B1-1 and B3.

As another example, a charging order of a vehicle B1 with a relatively large required charging amount and ample available waiting time may be changed to a lower priority when a vehicle B3, which lacks an available waiting time compared to a required charging amount, is added as the charging waiting vehicle. When the vehicle B1 allows waiting delay, the electric motor vehicle charging system wo may allow the battery charging to be performed by being divided two or more times. The electric motor vehicle charging system wo may divide a one-time charging amount based on a remaining amount to be charged (the required charging amount) of vehicle B1, and determine a charging order of vehicles B1-1 and B1-2 based on the one-time charging amount.

Figure 4:
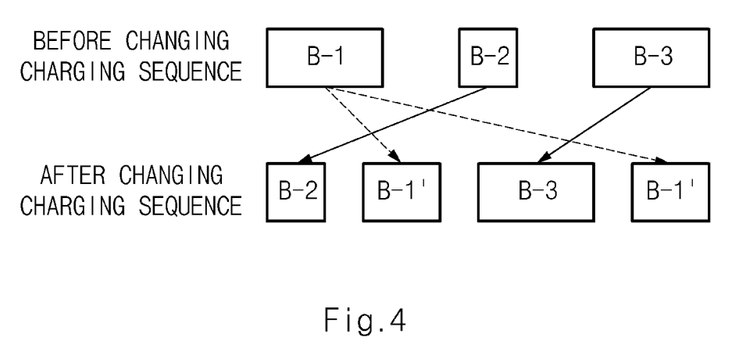
FIG. 4 is an exemplary diagram for illustrating a charging order adjustment method according to embodiments of the present disclosure.
Figure 5A:
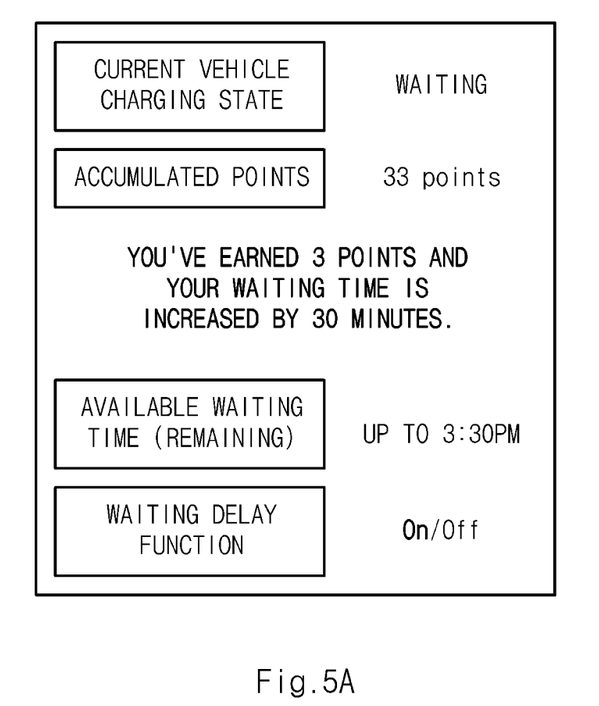
FIGS. 5A and 5B are exemplary diagrams illustrating a user interface screen based on charging order adjustment according to embodiments of the present disclosure.
Figure 5B:
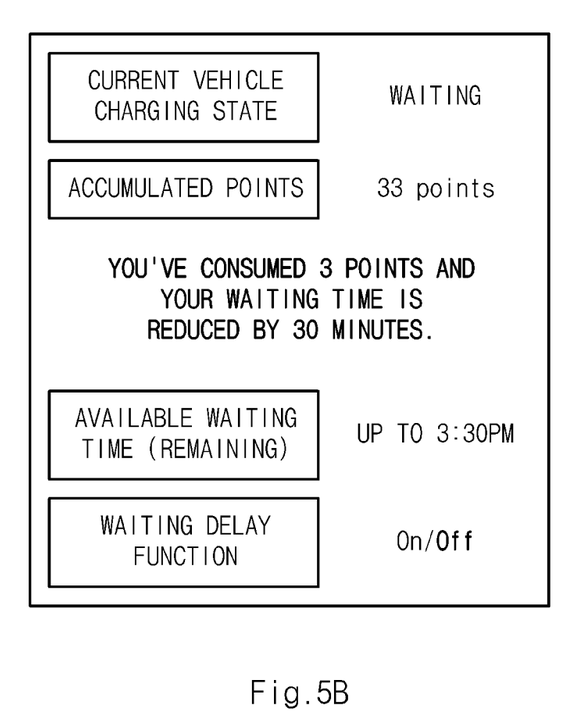

FIG. 4 is an exemplary diagram for illustrating a charging order adjustment method according to embodiments of the present disclosure. FIGS. 5A and 5B are exemplary diagrams illustrating a user interface screen based on charging order adjustment according to embodiments of the present disclosure.

A charging order based on charging request time points may be in an order of B-1, B-2, and B-3. However, when it is assumed that each of B-1, B-2, and B-3 is in each following situation, the charging order may be changed.

B-1: has arrived at the charging station first, but has a relatively large required charging amount and ample available waiting time.

B-2: has the smallest required charging amount, but there are already many charging waiting vehicles ahead.

B-3: arrived at the charging station the latest, but has the available waiting time that is short compared to the required charging amount.

As an example, when B-2 makes the charging request in a situation in which B-1 is waiting for the charging, the controller 160 may change a charging order of B-2 to a higher priority by determining that a charging priority of B-2 is higher than that of B-1.

As another example, when B-3 makes the charging request in the situation in which B-1 is waiting, the controller 160 may divide a charging amount based on a remaining amount to be charged of B-1, and may determine a charging priority of each divided charging amount B-1'. In this connection, the controller 160 may change a charging order for a portion of the divided charging amount B-1' of B-1 to a lower priority than B-3.

The controller 160 may deduct predetermined points from points of a user whose charging order is changed to a higher priority, and pay the deducted points to a user whose charging order is changed to a lower priority as the compensation points. The controller 160 may transmit information notifying the point deduction or the compensation point payment to the user terminal. As shown in FIG. 5A, a message notifying point acquisition resulted from the compensation point payment and a waiting time increase may be displayed on a terminal of the user whose charging order is changed to the lower priority. In addition, as shown in FIG. 5B, a message notifying the point deduction and the waiting time reduction may be displayed on a terminal of the user whose charging order is changed to the higher priority. On the user terminal, a current vehicle charging state, the accumulated points, the available waiting time, whether the waiting delay function is activated, and the like may be displayed.

Figure 6:
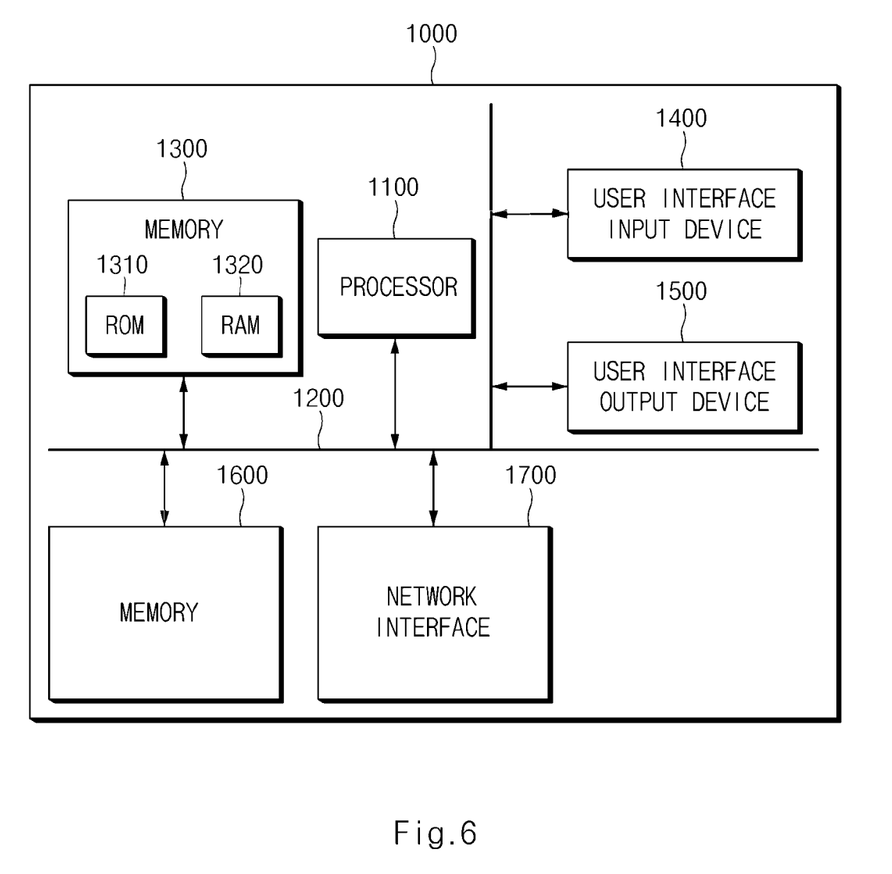
FIG. 6 is a block diagram showing a computing system executing an electric motor vehicle charging method according to embodiments of the present disclosure.

FIG. 6 is a block diagram showing a computing system executing an electric motor vehicle charging method according to embodiments of the present disclosure.

With reference to FIG. 6, a computing system 1000 may include at least one processor 1100, a memory 1300, a user interface input device 1400, a user interface output device 1500, a memory (i.e., a storage) 1600, and a network interface 1700 connected via a bus 1200.

The processor 1100 may be a central processing unit (CPU) or a semiconductor device that performs processing on commands stored in the memory 1300 and/or the memory 1600. The memory 1300 and the memory 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the memory 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor 1100 and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure. Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

According to embodiments of the present disclosure, because the charging order is dynamically adjusted in consideration of the required charging amount and the available waiting time, the vehicle charging may be efficiently performed, and inconvenience caused by waiting for the charging may be eliminated.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system for charging an electric motor vehicle, the system comprising:
    a first switching circuit configured to select one of a plurality of chargers;
    a second switching circuit configured to select a charging station connector to be connected to the charger selected by the first switching circuit; and
    a controller configured to:
        control the first switching circuit and the second switching circuit based on a predetermined charging order to allow charging of a battery of a vehicle that is connected to the charging station connector to be performed;
        sense connection of a charging connector of the vehicle to the charging station connector;
        receive a required charging amount and an available waiting time of the vehicle;
        determine the charging order based on the required charging amount and the available waiting time of each vehicle; and
        supply charging power to each vehicle based on the determined charging order.

2. The system of claim 1, wherein the available waiting time is a time from a charging request time point to a desired charging completion time point.

3. The system of claim 1, wherein the controller is configured to consider whether waiting delay is allowed for the vehicle when determining the charging order.

4. The system of claim 1, wherein the controller is configured to pay compensation points to the vehicle that has the charging order changed to a lower priority.

5. The system of claim 1, wherein the controller is configured to deduct predetermined points from the vehicle that has the charging order changed to a higher priority.

6. The system of claim 1, wherein the controller is configured to determine an expected charging start time, an expected charging completion time, and a power distribution location based on a charger distribution status.

7. The system of claim 6, wherein the controller is configured to control the first switching circuit and the second switching circuit based on the power distribution location to form a charging power supply path.

8. The system of claim 1, wherein the controller is configured to flexibly adjust the charging order of the vehicle within the available waiting time.

9. A method for charging an electric motor vehicle using a charging system including a first switching circuit for selecting one of at least two chargers, a second switching circuit for selecting a charging station connector to be connected to the charger selected by the first switching circuit, and a controller configured to control the first switching circuit and the second switching circuit, the method comprising:

sensing a connection to the charging station connector by a charging connector of a vehicle that has requested charging;

receiving a required charging amount and an available waiting time of the vehicle that has requested the charging;

determining a charging order of the vehicle that has requested the charging based on the required charging amount and the available waiting time of each vehicle; and controlling the first switching circuit and the second switching circuit based on the charging order to perform charging of a battery of the vehicle that has requested the charging.

10. The method of claim 9, wherein the available waiting time is a time from a charging request time point to a desired charging completion time point.

11. The method of claim 9, wherein determining the charging order of the vehicle that has requested the charging comprises determining the charging order by considering whether waiting delay is allowed for the vehicle that has requested the charging.

12. The method of claim 9, wherein determining the charging order of the vehicle that has requested the charging further comprises paying compensation points to the vehicle that has the charging order changed to a lower priority.

13. The method of claim 9, wherein determining the charging order of the vehicle that has requested the charging further comprises deducting predetermined points from the vehicle that has the charging order changed to a higher priority.

14. The method of claim 9, wherein determining the charging order of the vehicle that has requested the charging further comprises determining an expected charging start time, an expected charging completion time, and a power distribution location based on a charger distribution status.

15. The method of claim 14, wherein performing the charging of the battery of the vehicle that has requested the charging comprises controlling the first switching circuit and the second switching circuit based on the power distribution location to form a charging power supply path.

16. A system for charging electric motor vehicles, the system comprising:

a first charger configured to supply power to a plurality of first charging station connectors connected to the first charger;

a second charger configured to supply power to a plurality of second charging station connectors connected to the second charger;

a first switching circuit configured to select the first charger or the second charger;

a second switching circuit configured to select one of the first charging station connectors connected to the first charger or one of the second charging stations connected to the second charger based on the selection of the first charger or the second charger by the first switching circuit; and a controller configured to:
control the first switching circuit and the second switching circuit to allow charging of batteries of vehicles that are connected to respective ones of the first and second charging station connectors;

sense connection of a charging connector of each of the vehicles to a respective one of the first and second charging station connectors;

receive a required charging amount, an available waiting time, and whether a waiting delay is allowed for each of the vehicles connected to the first and second charging station connectors;

determine a charging order of the vehicles based on the required charging amounts, the available waiting times, and whether the waiting delay is allowed; and supply charging power to the vehicles based on the determined charging order.

17. The system of claim 16, wherein the available waiting time is a time from a charging request time point to a desired charging completion time point.

18. The system of claim 16, wherein in determining the charging order of the vehicles, the controller is configured to:

lower a priority of one of the vehicles and pay compensation points to the one of the vehicles; and raise a priority of another of the vehicles and deduct a predetermined number of points from the other of the vehicles.

19. The system of claim 16, wherein the controller is configured to determine an expected charging start time, an expected charging completion time, and a power distribution location based on a charger distribution status.

20. The system of claim 19, wherein the controller is configured to control the first switching circuit and the second switching circuit based on the power distribution location to form a charging power supply path.

* * * * *